US 6,594,396 B1

(12) United States Patent
Yoshida et al.

(10) Patent No.: US 6,594,396 B1
(45) Date of Patent: Jul. 15, 2003

(54) ADAPTIVE DIFFERENCE COMPUTING ELEMENT AND MOTION ESTIMATION APPARATUS DYNAMICALLY ADAPTING TO INPUT DATA

(75) Inventors: Toyohiko Yoshida, Hyogo (JP); Vasily Moshnyaga, 304 Kaizer Bldg., 2-5-32, Umebayashi, Jonan-ku, Fukuoka-shi, Fukuoka 814-0144 (JP)

(73) Assignees: Mitsubishi Denki Kabushiki Kaisha, Tokyo (JP); Vasily Moshnyaga, Tokyo (JP)

( * ) Notice: Subject to any disclaimer, the term of this patent is extended or adjusted under 35 U.S.C. 154(b) by 0 days.

(21) Appl. No.: 09/292,380

(22) Filed: Apr. 15, 1999

(30) Foreign Application Priority Data

Sep. 29, 1998 (JP) ............................................ 10-275141

(51) Int. Cl.[7] .............................. G06K 9/36; G06F 7/38
(52) U.S. Cl. ........................ 382/236; 382/247; 708/201
(58) Field of Search ................................ 382/236, 238, 382/239, 247; 703/201, 801, 209, 497; 708/201, 209, 505, 670, 700, 714

(56) References Cited

U.S. PATENT DOCUMENTS

| 4,802,112 A | | 1/1989 | Yoshida et al. ............. 708/703 |
| 5,390,307 A | * | 2/1995 | Yoshida ....................... 708/201 |
| 5,528,525 A | * | 6/1996 | Suzuki et al. ................ 708/209 |
| 5,917,732 A | * | 6/1999 | Kawakami et al. ......... 708/201 |

OTHER PUBLICATIONS

"VLSI Architectures for Video Compression–A Survey", Pirsch et al., Proc. IEEE, vol. 83, No. 2, Feb. 1995, pp. 220–246.

"ULSI Realization of MPEG2 Realtime Video Encoder and Decoder–An Overview", Yoshimoto et al., IEICE Trans. Electron., vol. E78–C, No. 12, Dec. 1995, pp. 1668–1681.

"A Half–pel Precision MPEG2 Motion–Estimation Procesor with Concurrent Three–Vector Search", Ishihara et al., ISSCC Digest of Technical Papers, vol. 30, No. 12, Dec. 1995, pp. 1502–1509.

"A Motion Estimation Processor for MPEG2 Video Real Time Encoding at Wide Search Range", Ohtani et al., Proc. IEEE Custom Integrated Circuits Conference, 1995, pp. 405–408.

"Reducing Hardware Complexity of Motion Estimation Algorithms Using Truncated Pixels", He et al., IEEE ISCAS 1997, pp. 2809–2812.

* cited by examiner

*Primary Examiner*—Andrew W. Johns
*Assistant Examiner*—Duy M. Dang
(74) *Attorney, Agent, or Firm*—McDermott, Will & Emery (57) ABSTRACT

An adaptive difference computing element which consumes less power without any decrease in calculation accuracy includes: a first circuit receiving first and second data with the same bit lengths and each having bits at one and the other ends, determining if a prescribed relation is obtained between a bit string from each bit to the bit at one end of the first data and that of the second data for each bit of the first data and corresponding each bit of the second data, and replacing the each bit of the first data and the corresponding each bit of the second data with same predetermined bit values if the prescribed relation is obtained, and otherwise directly outputting the first and second data; and a subtracter having inputs connected to receive the first and second data from the first circuit, respectively.

7 Claims, 10 Drawing Sheets

If Qc≤Qp and NTB≤6
then NTB=NTB+1;
else If Qc>Qp and NTB>1
   then NTB=NTB-1;
      else NTB NOT CHANGED

ADAPTIVE DIFFERENCE COMPUTING ELEMENT AND MOTION ESTIMATION APPARATUS DYNAMICALLY ADAPTING TO INPUT DATA

BACKGROUND OF THE INVENTION

1. Field of the Invention

The present invention relates to adaptive difference computing elements and motion estimation apparatuses, and more particularly to an adaptive difference computing element and motion estimation apparatus dynamically adapting to input data with a reduced amount of circuit operation.

2. Description of the Background Art

A motion estimation apparatus is used in a moving picture compression system for MPEG (Moving Picture Experts Group) and performs a large number of computations. To date, various computation algorithms for the motion estimation apparatus have been proposed. For the moving picture compression system for MPEG, "VLSI Architectures for Video Compression-A Survey", by P. Pirsch et al., Proc. IEEE Vol. 83, No. 2, pp. 220–246, 1995 and "ULSI Realization of MPEG2 Realtime Video Encoder and Decoder-An Overview", by M. Yoshimoto et al., IEICE Trans. Electron., Vol. E78-C, No. 12, pp. 1668–1681, 1995 are incorporated herein by reference.

In addition, for an LSI (Large Scale Integration) for motion estimation computation, "A Half-pel Precision MPEG2 Motion-Estimation Processor with Concurrent Three-Vector Search", by K. Ishihara et al., ISSCC Digest of Technical Papers, pp.1502–1509, 1995 and "A Motion Estimation Processor for MPEG2 Video Real Time Encoding at Wide Search Range", by A. Ohtani et al., Proc. IEEE Custom Integrated Circuits Conference, pp. 405–408, 1995 are incorporated herein by reference.

In the moving picture compression system for MPEG, difference must be calculated between pixel values (sample values) of a reference block and one of blocks to be searched corresponding to one of a large number of candidate vectors within a search range. Most of the computation performed by a whole system is the computation performed by the motion estimation apparatus. Therefore, it is critically important that difference calculation is performed by a circuit with power consumption which is as small as possible in order to achieve a moving picture compression system with reduced power consumption.

Figure 1:
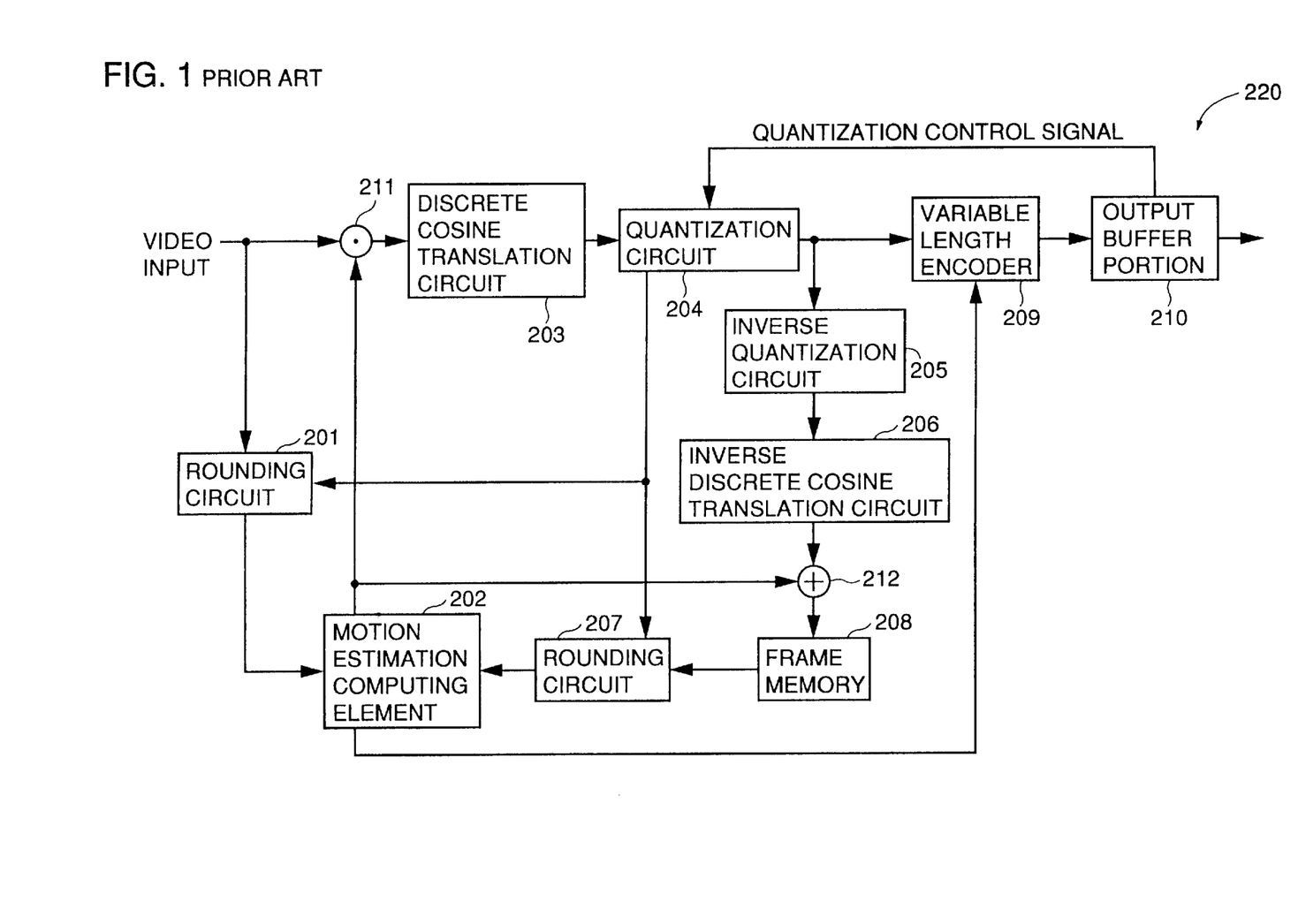
FIG. 1 is a diagram showing a structure of a conventional encoding apparatus.

To cope with this subject, an encoding apparatus 220 has been proposed which is shown in FIG. 1. Encoding apparatus 220 includes: a rounding circuit 201 rounding lower bits of a prescribed number of bits in accordance with an output from a quantization circuit 204, which will later be described, for every sample of image data of a current frame which has been input from a video input; a frame memory 208 connected to an output of an addition circuit 212, which will later be described, for storing image data; a rounding circuit 207 rounding lower bits of a prescribed number of bits in accordance with an output from a quantization circuit 204 which will later be described for every sample of image data which has been stored in frame memory 208; a motion estimation computing element 202 receiving image data of the current frame input from the video input and that of a preceding frame stored in frame memory 208 respectively through rounding circuits 201 and 207 and calculating a sum of absolute difference between data elements of a reference block and those of one of blocks to be searched; a selector 211 connected to an output of motion estimation computing element 202 and the video input for selecting and outputting one of the above mentioned output or input; a discrete cosine translation circuit 203 connected to an output of selector 211; a quantization circuit 204 connected to an output of discrete cosine translation circuit 203 for quantizing in accordance with a quantization control signal output from a output buffer portion 210 which will later be described; a variable length encoder 209 connected to outputs of quantization circuit 204 and motion estimation computing element 202; an output buffer portion 210 connected to an output of variable length encoder 209; an inverse quantization circuit 205 connected to an output of quantization circuit 204; an inverse discrete cosine translation circuit 206 connected to an output of inverse quantization circuit 205; and an addition circuit 212 connected to outputs of inverse discrete cosine translation circuit 206 and motion estimation computing element 202 for performing addition of data elements of two blocks and reconstructing the block.

Figure 2:
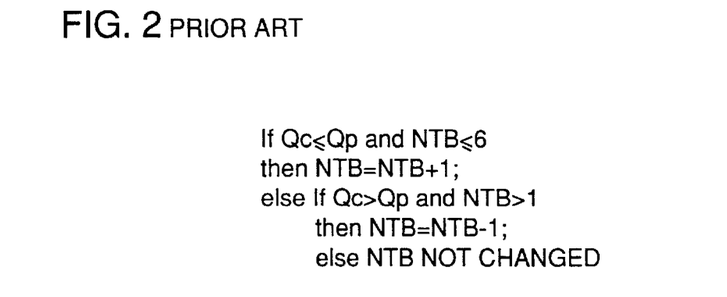
FIG. 2 is a flow chart showing an operation of the conventional encoding apparatus.

In encoding apparatus 220, an amount of data accumulated in output buffer portion 210 increases as the amount of encoded data increases. Thus, a quantization step value is increased to decrease the amount of encoded data. If the amount of encoded data decreases, conversely, it is controlled to increase. At the time, significant digit numbers of samples of the reference block and one of blocks to be searched applied to motion estimation computing element 202 are determined in accordance with an algorithm shown in FIG. 2. NTB represents the number of non-trancated bits, and lower bits which are not included in the non-trancated upper bits are rounded in rounding circuits 201 and 207. Quantization step values of the current and preceding frames are respectively represented by Qc and Qp. More specifically, if quantization step value Qc is equal to or smaller than quantization step value Qp and NTB is equal to or smaller than a possible maximum value 6, NTB is incremented by 1. Thus, the number of the lower bits to be rounded is decreased. Conversely, if quantization step value Qc is greater than quantization step value Qp and NTB is greater than 1, NTB is decremented by 1. Thus, the number of the lower bits to be rounded is increased. A number of significant bits of data computed by motion estimation computing element 202 can be decreased on the average in accordance with the algorithm. As described above, a method has been proposed which allows power consumption to be reduced by reducing calculation accuracy for adding absolute differences. Encoding apparatus 220 has been disclosed in "Reducing Hardware Complexity of Motion Estimation Algorithms Using Truncated Pixels", IEEE ISCAS'97, 1997, by Zhongli He et al., which is herein incorporated by reference.

The above described encoding apparatus 220 suffers from a problem that the calculation accuracy of the motion estimation computing element is reduced as the lower bits are rounded.

In addition, if calculation is simply performed using data with all bits without rounding the lower bits, a signal change occurs many times which in turn increases power consumed by the circuit.

SUMMARY OF THE INVENTION

The present invention is made to solve the aforementioned problem. An object of the present invention is to provide an adaptive difference computing element and a motion estimation apparatus which consumes less power without any decrease in calculation accuracy.

Another object of the present invention is to provide an adaptive difference computing element and a motion estimation apparatus which can reduce the number of signal changes in a calculation circuit without any decrease in calculation accuracy.

Still another object of the present invention is to provide an adaptive difference computing element and a motion estimation apparatus capable of performing motion estimation without any decrease in calculation accuracy while substantially decreasing the number of bits of data to be calculated.

An additional object of the present invention is to provide an adaptive difference computing element and a motion estimation apparatus capable of performing motion estimation without rounding data with reduced power consumption.

Another additional object of the present invention is to provide an adaptive difference computing element and a motion estimation apparatus capable of performing motion estimation without any decrease in calculation accuracy by performing calculation for only a portion of data with reduced power consumption.

Another additional object of the present invention is to provide an adaptive difference computing element and a motion estimation apparatus capable of performing motion estimation without any decrease in calculation accuracy by performing calculation for only a portion of data for which variation in values occurs with reduced power consumption.

An adaptive difference computing element according to one aspect of the present invention includes: a first circuit receiving first and second data with the same bit length and each having bits at one and the other ends, determining if a prescribed relation is obtained between a bit string of the first data and that of the second data for each bit of the first data and corresponding each bit of the second data, and replacing the each bit of the first data and the corresponding each bit of the second data with the same predetermined bit values if the prescribed relation is obtained, and otherwise directly outputting the first and second data; and a subtracter having inputs connected to receive the first and second data from the first circuit.

In calculating a difference between the first and second data, a difference between two data is calculated which have been replaced by bit values predetermined by values of bits which can preliminary predict a difference result. Thus, the number of signal changes is reduced. As a result, an adaptive difference computing element which consumes less power without any decrease in calculation accuracy is provided.

Preferably, the first circuit includes a second circuit determining if the bit string of the first data and that of the second data match for each bit of the first data and corresponding each bit of the second data, and replacing the each bit of the first data and the corresponding each bit of the second data with the same predetermined bit values if they match, and otherwise directly outputting the first and second data.

In calculating a difference between the first and second data, a difference is calculated between two data which have been replaced by bit values predetermined by values of bits which are preliminary found to provide a difference result of 0. Thus, the number of signal changes decreases. As a result, the adaptive difference computing element which consumes less power without any decrease in calculation accuracy can be provided.

More preferably, the second circuit includes: a plurality of bit string matching circuits provided corresponding to a pair of bits including each bit of the first data and the corresponding each bit of the second data for determining if the pair of bits are equal for every pair of bits and outputting a determination signal; a circuit for outputting the predetermined bit value in a fixed state; and a plurality of selector circuits provided corresponding the plurality of bit string matching circuits, each having an input corresponding pairs of bits of the first and second data and an input receiving predetermined bit values, and being controlled by the determination signal output from a corresponding bit string matching circuit.

An adaptive difference computing element according to another aspect of the present invention includes: a first circuit receiving first and second binary data for determining if upper bit values of bit strings including target bits match for the first and second data; first and second shifters for shifting the first and second data toward the side of an upper bit by the number of bits depending on how many upper bit values of bit strings match; a subtracter for calculating a difference between data from the first and second shifters; and a third shifter connected to the subtracter for shifting back an output from the subtracter toward the side of a lower bit. The bit width of data input to the subtracter is smaller than those of the first and second data.

The data which has been shifted toward the side of the upper bit is applied to the subtracter in accordance with the number of bits of the upper bits which provide 0 for the difference result. Thereafter, the output from the subtracter is shifted toward the side of the lower bit by the prescribed number of bits such that the output from the subtracter is shifted back to the original position. Thus, input and output bit widths of the subtracter are reduced, so that the number of signal changes decreases. Therefore, an adaptive difference computing element which consumes less power consumption without any decrease in calculation accuracy can be provided.

A motion estimation apparatus according to still another aspect of the present invention includes: an input portion receiving a reference frame and an image frame to be searched, extracting a reference block from the reference frame for output and sequentially outputting a plurality of blocks to be searched corresponding to the reference block from the image frame to be searched for the reference block; an absolute difference sum circuit calculating an accumulated sum of absolute difference values between corresponding pixels for each of the plurality of blocks to be searched with respect to the reference block; and an output portion identifying a position of a block to be searched in the image frame which provides the minimum accumulated sum. The absolute difference sum circuit includes: a difference computing element sequentially receiving sample data of the reference block and one of blocks to be searched with the same bit width for calculating an absolute difference value; and a latch holding an accumulated sum. The difference computing element includes: a first circuit sequentially receives sample data of the reference block and one of blocks to be searched, determines if a prescribed relation is obtained between the sample data of the reference block and that of one of blocks to be searched, and replaces upper bits of the sample data of the reference block and one of blocks to be searched with the same predetermined bit values if the prescribed relation is obtained, and otherwise directly outputs the sample data of the reference block and one of blocks to be searched; and a subtracter having inputs connected to receive the sample data of the reference block and one of blocks to be searched from the first circuit.

In calculating a difference between the sample data of the reference block and one of blocks to be searched, a difference is calculated between two data which have been replaced by bit values predetermined by values of bits which can provide a prediction on a difference result. Thus, the number of signal changes decreases. As a result, a motion estimation apparatus which consumes less power without any decrease in calculation accuracy can be provided.

Preferably, the first circuit includes a second circuit determining if a bit string of sample data of the reference block and that of one of blocks to be searched match for each bit, replacing the each bit of the sample data of the reference block and corresponding each bit of the sample data of one of blocks to be searched with the same predetermined bit values if they match, and otherwise directly outputting sample data of the reference block and one of blocks to be searched.

In calculating a difference between sample data of the reference block and one of blocks to be searched, a difference is calculated between the two data which have been replaced by bit values predetermined by values of bits which are determined to provide 0 for a difference result. Thus, the number of signal changes decreases. As a result, the motion estimation apparatus which consumes less power without any decrease in calculation accuracy can be provided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

A motion estimation apparatus according to one embodiment of the present invention will now be described with reference to the drawings.

Figure 3:
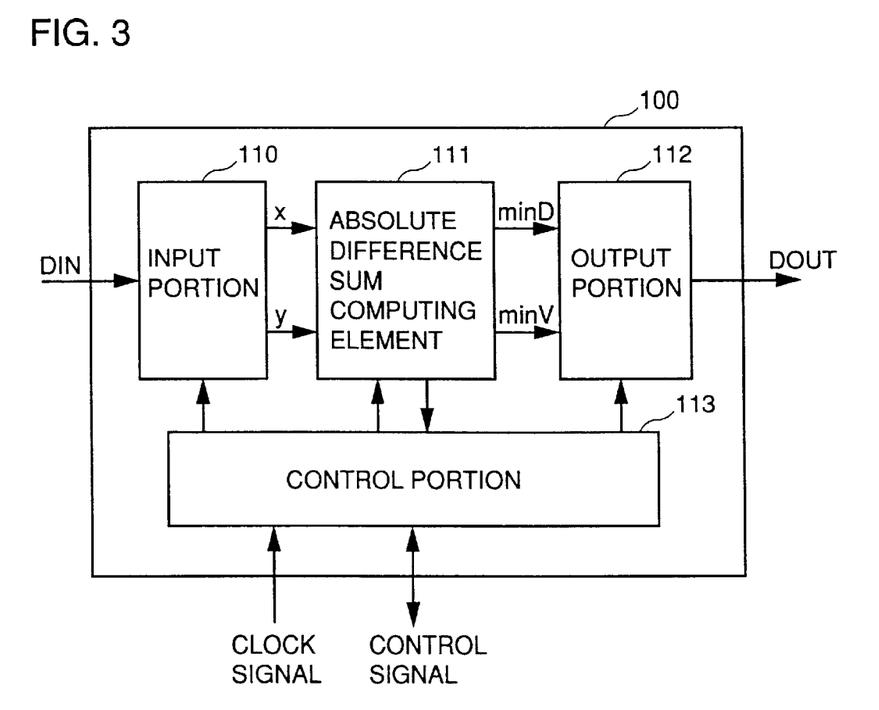
FIG. 3 is a diagram showing a structure of a motion estimation apparatus according to a first embodiment of the present invention.

Referring to FIG. 3, a motion estimation apparatus 100 includes an input portion 110, an absolute difference sum computing element 111 connected to an output of motion estimation apparatus 100, an output portion 112 connected to an output of absolute difference sum computing element 111, and a control portion 113 controlling input portion 110, absolute difference sum computing element 111, and output portion 112.

Figure 4A:
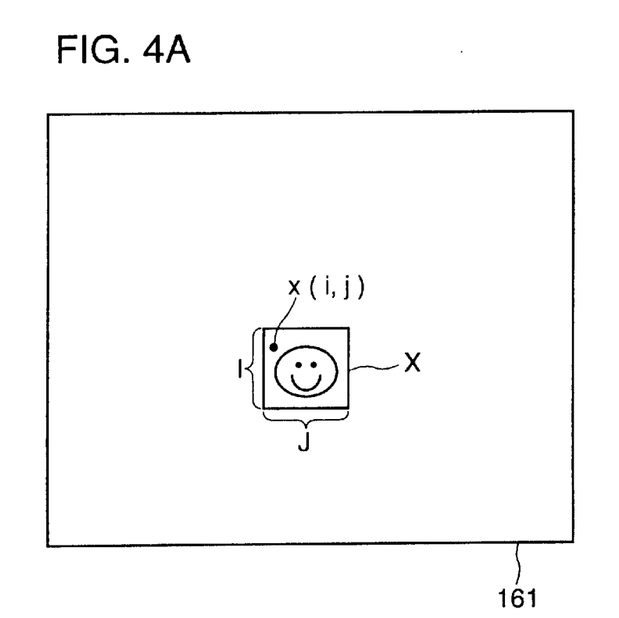
FIGS. 4A to 4B are diagrams in connection with a relation between a reference block and one of blocks to be searched.
Figure 4B:
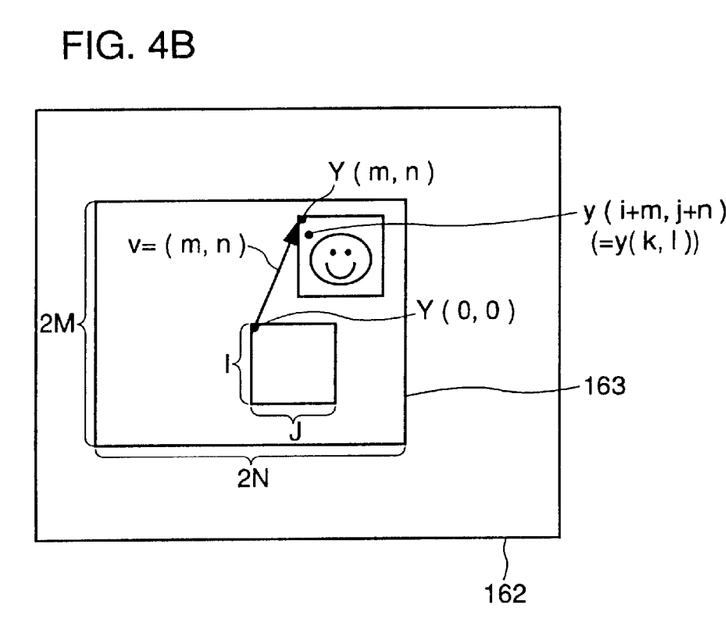

Referring to FIGS. 4A and 4B, input portion 110 receives image data of a current frame (a reference frame) 161 and image data of a preceding frame (an image frame to be searched) 162 for sequentially outputting values of (IxJ) samples x(i, j) within a reference block X and for sequentially outputting values of (IxJ) samples y(i+m, j+n)(=y(k, l)) within one of blocks to be searched Y(m, n) corresponding to each of (2Mx2N) vectors v=(m, n) in a search range 163. Search range 163 has its center corresponding to an upper left corner of reference block X. In addition, one of blocks to be searched in the same position as reference block X is set as Y(0, 0). It is noted that each position within search range 163 corresponds to a position at the upper left corner of one of blocks to be searched Y(m, n).

Absolute difference sum computing element 111 sequentially outputs values of samples x(i, j) and y(k, l) output from input portion 110, calculates an absolute difference sum D between reference block X and each of (2Mx2N) blocks to be searched Y(m, n), and outputs a value of a vector minv=(minm, minn), which is a vector v=(m, n) where the absolute difference sum D is minimum. Output portion 112 receives minimum absolute difference sum D and vector v=(m, n) for outputting values thereof at a suitable timing.

Figure 5:
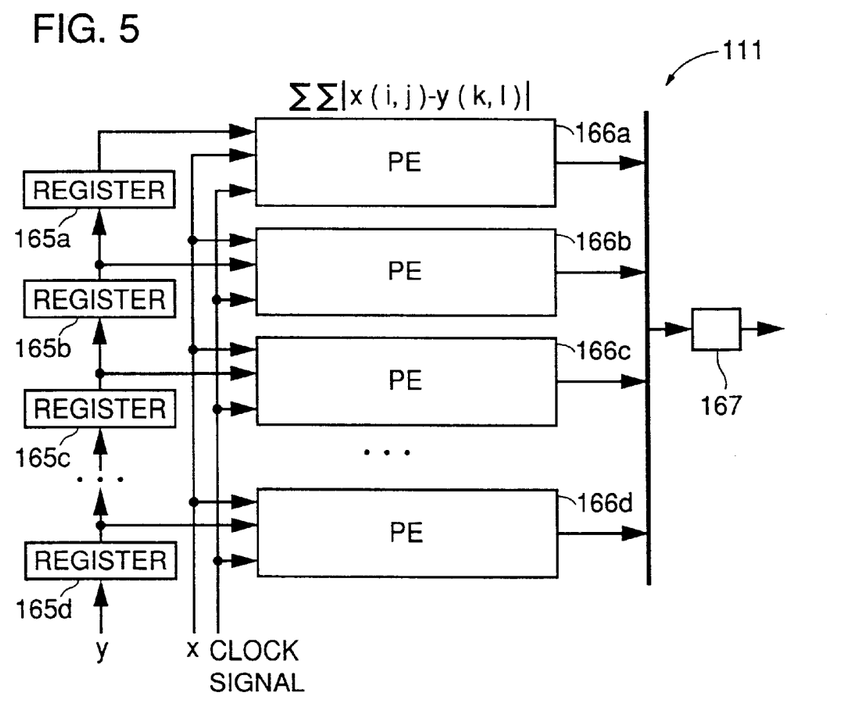
FIG. 5 is a diagram showing a structure of an absolute difference sum computing element.

Referring to FIG. 5, absolute difference sum computing element 111 includes: a plurality of registers 165a to 165d each for holding a value of sample y(k, l) which is necessary for calculating the absolute difference sum; a plurality of processing elements (PE) 166a to 166d arranged in an array and each receiving a clock signal, the value of sample x(i, j) and values held in registers 165a to 165d for calculating the absolute difference sum between reference block X and one of blocks to be searched Y(m, n); a minimum absolute difference sum holding circuit 167 connected to outputs of the plurality of PEs 166a to 166d for holding the minimum value of the absolute difference sum; and the minimum vector holding circuit (not shown) holding a value of vector v=(m, n) where the absolute difference sum is minimum.

Each of the plurality of registers 165a to 165d is connected to adjacent registers and writes a value held in the adjacent one of registers 165b to 165d to itself at a prescribed timing.

Figure 6:
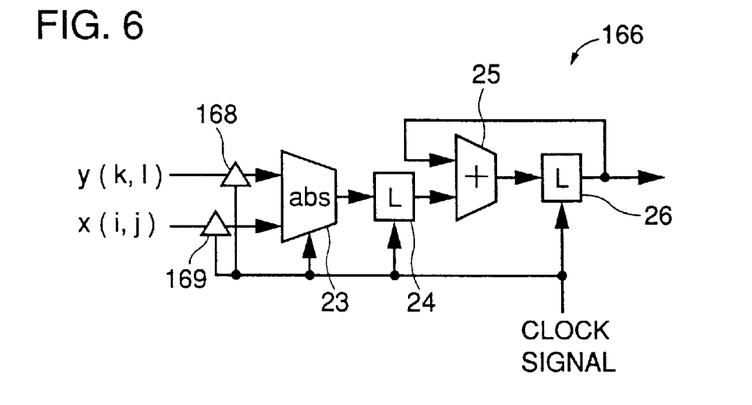
FIG. 6 is a diagram showing a structure of a processing element (PE).

Referring to FIG. 6, each of the plurality of PEs 166a to 166d (which are collectively called PE166 in FIG. 6) includes: a gate 168 passing the value of sample y(k, l) at the rise (or fall) of the clock signal; a gate 169 passing the value of sample x(i, j) at the rise (or fall) of the same clock signal; a difference computing element 23 connected to outputs of gates 168 and 169 for calculating an absolute difference between values of samples x(i, j) and y(k, 1); a latch 24 holding an output from difference computing element 23; an adder 25 receiving values held in latch 24 and a latch 26 which will later be described; and a latch 26 holding an output from adder 25, that is, an accumulated value of absolute differences between samples x(i, j) and y(k, l) in a certain search position. Latches 24 and 26 receive clock signals for latching and outputting data at a prescribed timing.

Samples x(i, j) and y(k, l) are hereinafter simply called as x and y.

Figure 7:
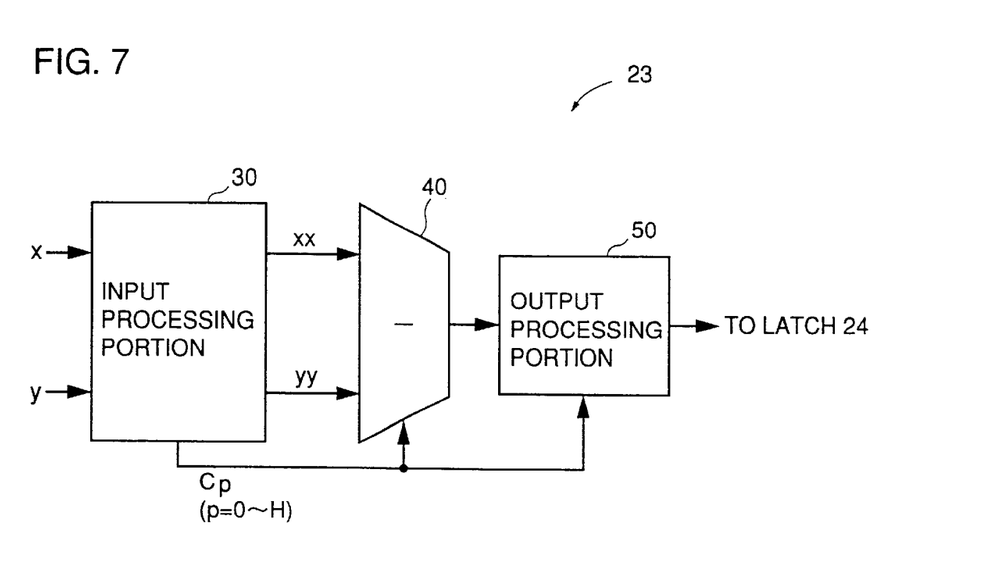
FIG. 7 is a diagram showing a structure of a difference computing element.

Referring to FIG. 7, difference computing element 23 includes: an input processing portion 30 receiving and performing prescribed process for samples x and y for outputting sample values xx and yy and a value Cp (later described) which is output when the prescribed process is performed; a subtracter 40 connected to input processing portion 30 for calculating difference values of sample values xx and yy; and an output processing portion 50 connected to input processing portion 30 and subtracter 40 for calculating an absolute difference of the above mentioned difference value and outputting an absolute difference of samples x and y.

Now, the above mentioned prescribed process performed in input processing portion 30 will be described. Here, assume that samples x and y are data with (H+1) bits. Each of samples x and y includes a target bit ($p^{th}$ bit, P=0~H). If values of bit strings of samples x and y which are in a positions upper than or equal to the target bit position are the same, bit values of the bit strings of sample values xx and yy are set to 0, and bit value 0 is output as Cp. The process is repeated for every bit. Assume, for example, values of samples x and y are respectively 011101 and 011001. In this case, sample values xx and yy are the same in the upper 3 bits. Thus, sample values xx and yy respectively turn to 000101 and 000001, which are obtained by replacing the upper 3 bits with 0.

Figure 8:
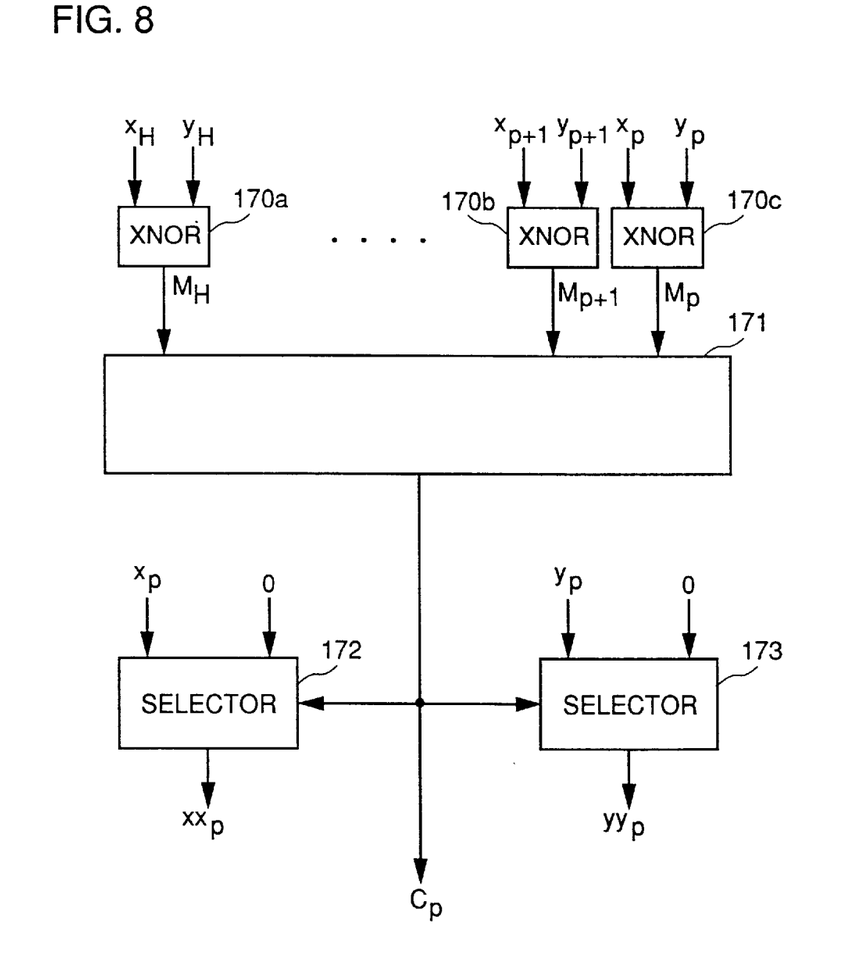
FIG. 8 is a diagram of a circuit for calculating a value of the $p^{th}$ bit for sample values xx and yy of an input processing portion.

Referring to FIG. 8, a circuit forming input processing portion 30 will be described. Input processing portion 30 includes (H+1) circuits shown in FIG. 8. It is noted that the circuit calculates $p^{th}$ bit values of sample values xx and yy as well as a value of Cp. The circuit includes (H-p+1) circuits 170a to 170c. Each of circuits 170a to 170c outputs a negation value Mi of exclusive OR between $i^{th}$ bit values of samples x and y (which are hereinafter referred to as xi and yi, respectively). The circuit further includes: a circuit 171 connected to circuits 170a to 170c for outputting 0 as value Cp when values Mp to MH are all 1, and otherwise outputting 1 as value Cp; a selector 172 connected to circuit 171 for outputting 0 as $p^{th}$ bit value of sample value xx (hereinafter referred to as xxp) when value Cp is 0, and outputting a value xp as a value xxp when value Cp is 1; and a selector 173 connected to circuit 171 for outputting 0 as $p^{th}$ bit value of sample value yy (hereinafter referred to as yyp) when value Cp is 0, and outputting a value yp when value Cp is 1.

Figure 9:
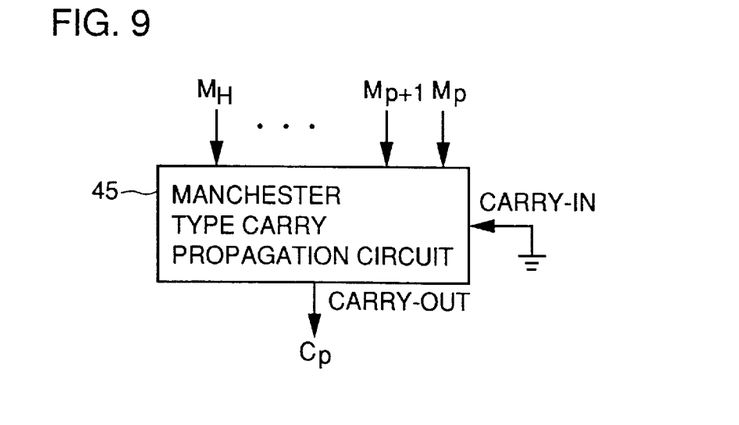
FIG. 9 is a circuit diagram in which a Manchester type carry propagation circuit is employed.

Referring to FIG. 9, circuit 171 may include a well-known Manchester type carry propagation circuit 45. In this case, the above described operation is achieved if a carry-in of the Manchester type carry propagation circuit 45 is connected to a ground. It is noted that Manchester type carry propagation circuit 45 is described in U.S. Pat. No. 4,802,112, which is incorporated herein by reference.

Figure 10:
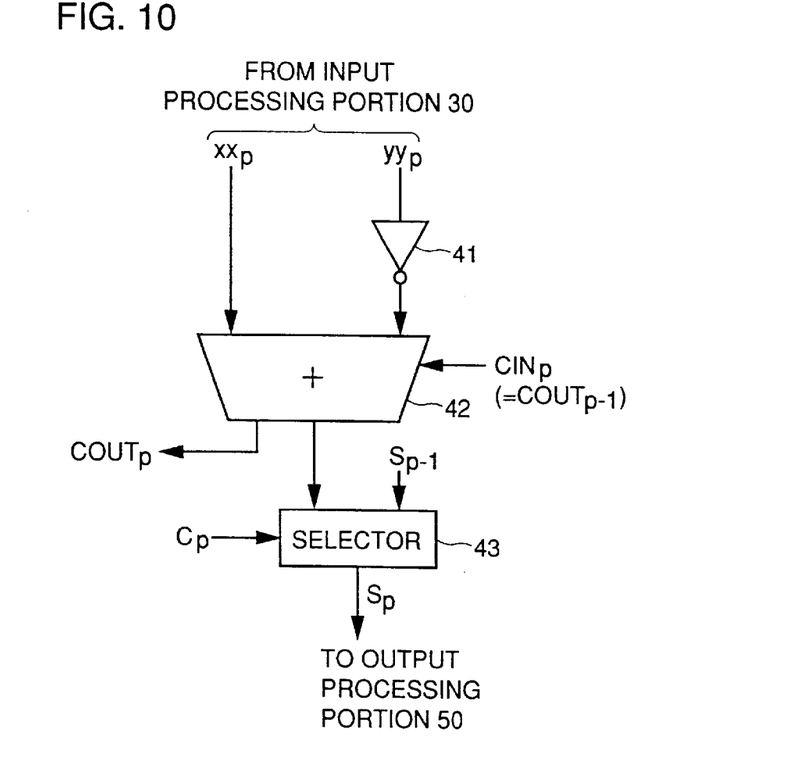
FIG. 10 is a diagram of a circuit for calculating a difference for the $p^{th}$ bit of a computing element.

Referring to FIG. 10, a circuit for calculating the $p^{th}$ bit difference value and forming subtracter 40 will now be described. The circuit is provided for every bit, and subtracter 40 includes (H+1) of such circuits. The circuit includes: an inverter 41 receiving value yyp; a full adder 42 connected to inverter 41 and receiving a negation value of yyp, a value xxp and a carry-in value CINp(=COUT(p-1)) which is obtained through calculation of an addition of xx(p-1) and a negation value of yy(p-1); and a selector 43 connected to full adder 42 for outputting a (p-1)th bit difference value S(p-1) when value Cp is 0 and outputting an addition result from full adder 42 when value Cp is 1. A carry-out value COUTp from full adder 42 is applied to full adder 42 of a circuit for calculating a (p+1)th bit difference value. Selector 43 outputs a (p-1)th bit difference value when Cp=0 because a sum obtained by calculation of bits when Cp=1 is transmitted to the most significant bit for a bit when Cp=0. It is noted that 1 is forcefully set as a carry-in value CIN0 applied to full adder 42 as a sign of value yy is inverted in the case of the least significant bit.

Figure 11:
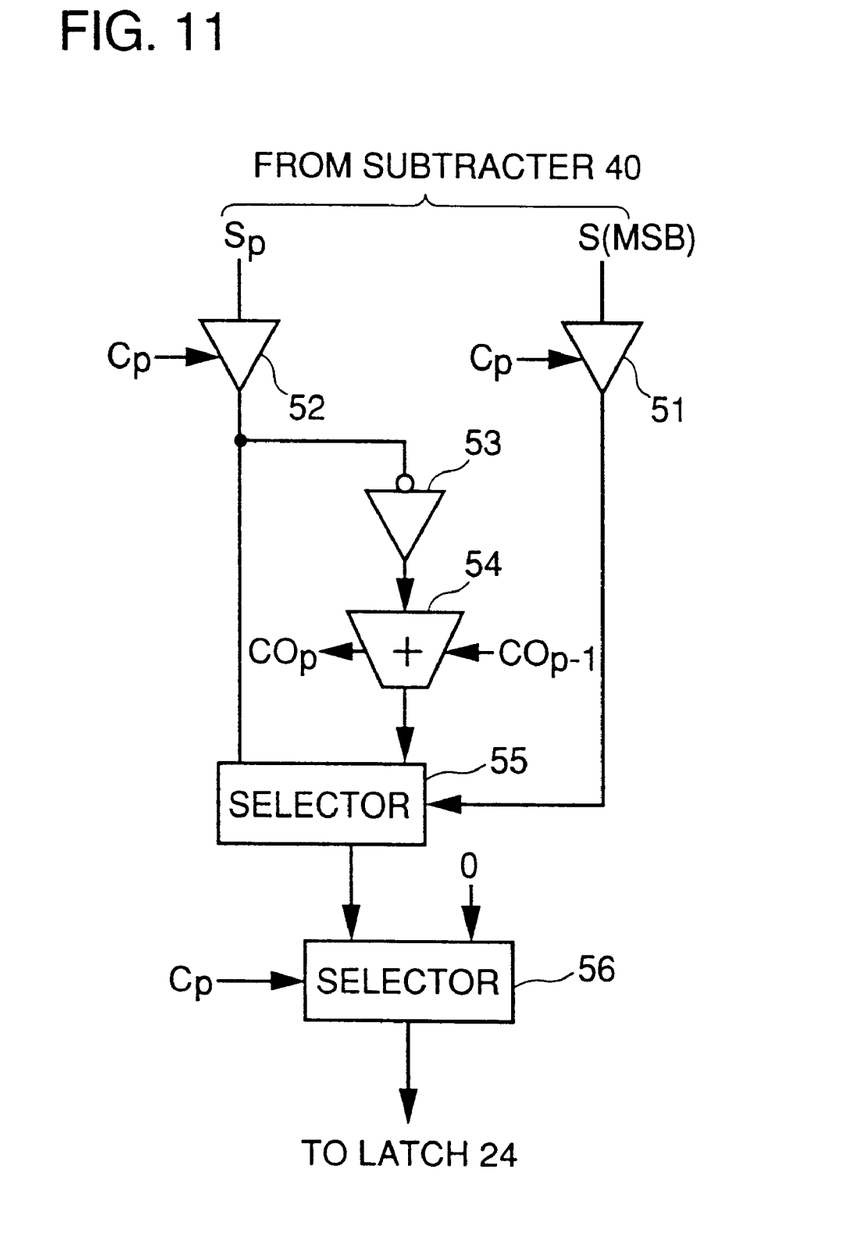
FIG. 11 is a diagram of a circuit for outputting an absolute value for the $p^{th}$ bit of an output processing portion.

Referring to FIG. 11, a circuit outputting a $p^{th}$ bit absolute value forming output processing portion 50 will be described. It is noted that the circuit is provided for every bit, and output processing portion 50 includes (H+1) of such circuits. The circuit includes: a gate passing a $p^{th}$ bit difference value Sp when Cp=1; an inverter 53 receiving an output from gate 52; an adder 54 receiving an output from inverter 53 and a carry-out value (CO(p-1)) of the (p-1)th bit adder 54; a gate 51 passing a difference value S(MSB) when Cp=1; a selector 55 directly outputting an output from gate 52, that is, difference value Sp when S(MSB)=1, and outputting a calculation result of adder 54 when S(MSB)=0; and a selector 56 forcefully outputting 0 when Cp=0 and outputting an output from selector 55 when Cp=1.

In motion estimation apparatus 100, one of blocks to be searched is extracted from a search range for which it is predicted that the difference value with respect to the reference block would be small, and the difference value between the reference block and one of blocks to be searched is calculated. Thus, difference values for a large number of samples are rendered small. This means that values of upper bits match (that is, Cp=0).

Figure 12:
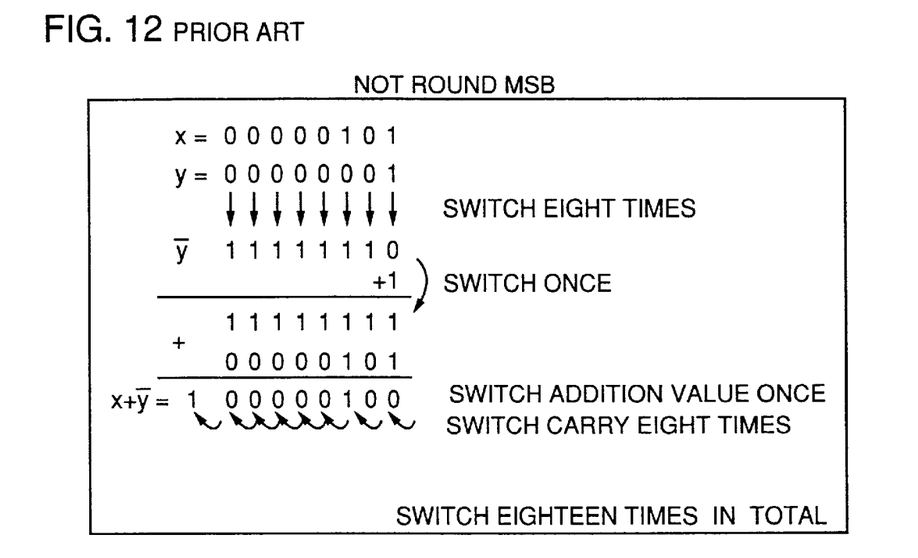
FIG. 12 is a diagram shown in conjunction with the number of signal changes when a difference between binary data is calculated in accordance with a conventional method.
Figure 13:
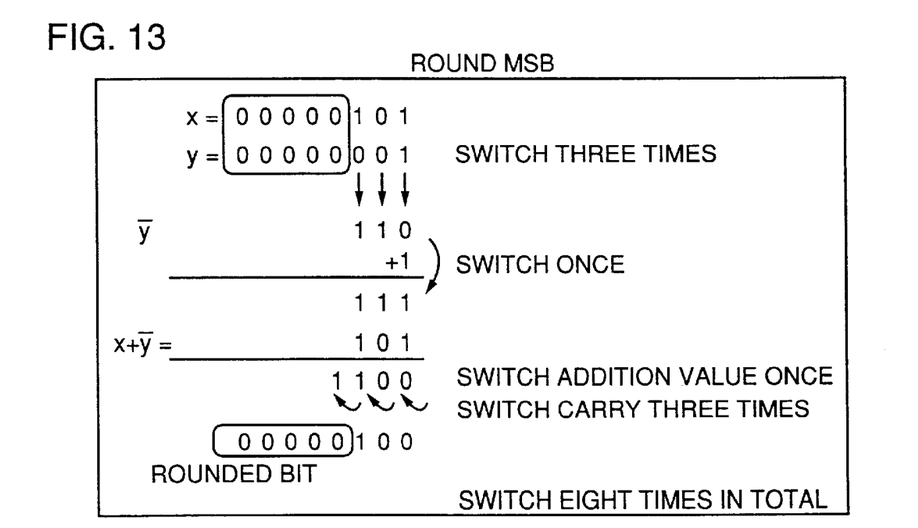
FIG. 13 is a diagram shown in conjunction with the number of signal changes when a difference between binary data is calculated using a difference computing element according to the first embodiment of the present invention.

FIG. 12 shows the number of signal changes when a difference between two binary data x=00000101 and y=00000001 are calculated without detecting a match between the upper bits. The number of signal changes is 18. On the other hand, FIG. 13 shows the number of signal changes when the difference between two data is calculated using difference computing element 23 according to the present embodiment. In this case, the number of signal changes is 8. The difference is calculated regardless of match/mismatch of upper bits in a usual method. In difference computing element 23, however, calculation for upper 5 bits is not performed as Cp=0 for those bits.

As described above, difference computing element 23 allows difference calculation with the smaller number of signal changes and high accuracy. In motion estimation apparatus 100 according to the present embodiment in which difference computing element 23 is used, reduction in the number of signal changes enables calculation with reduced amount of power consumption and high accuracy.

It is noted that, in input processing portion 30, when values of bits which are upper in position than a target bit are the same for samples x and y, the values of those bits are replaced by 0. Similarly, when values of bits which are lower in position than the target bit are the same for samples x and y, the values of those bits may be replaced with 0. Subtracter 40 may be configured such that the calculation for those bits is not performed.

Second Embodiment

A motion estimation apparatus according to the present embodiment has a structure which is similar to motion estimation apparatus 100 described in the first embodiment. Therefore, description of different parts of the structure is only given, and that of all the other parts will not be repeated.

Figure 14:
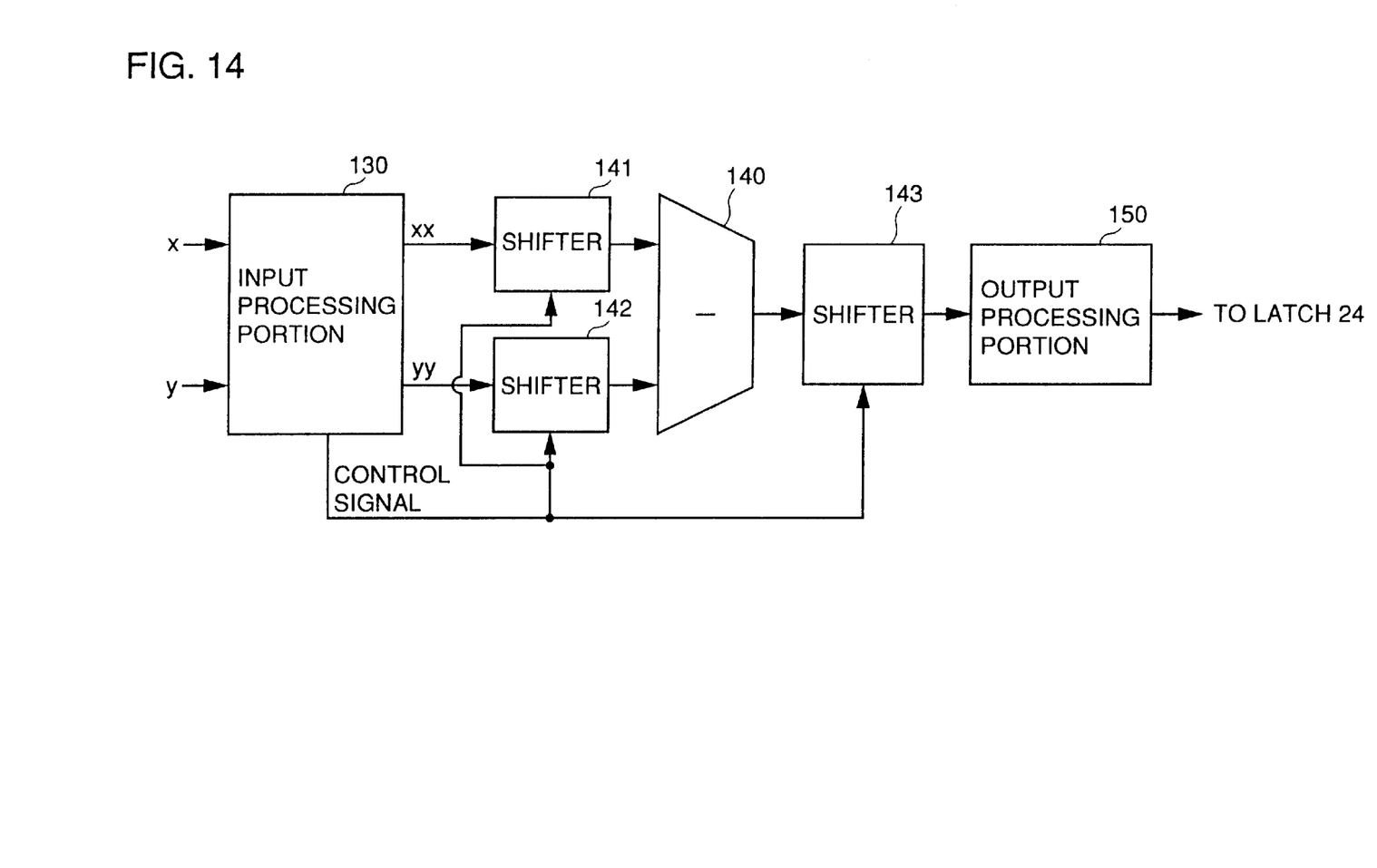
FIG. 14 is a diagram showing a structure of a difference computing element according to a second embodiment of the present invention.

Referring to FIG. 14, a difference computing element 23 according to the present embodiment includes: an input processing portion 130 receiving values of samples x and y for outputting sample values xx and yy which are the same as those output from input processing portion 30 of the first embodiment and applying control signals to shifters 141, 142 and 143 which will later be described; shifter 141 for left shifting sample value xx by a prescribed number of bits in accordance with the above mentioned control signal; shifter 142 for left shifting sample value yy by a prescribed number of bits in accordance with the control signal; a subtracter 140 receiving data with widths from the most significant bits to prescribed bits of sample values xx and yy from shifters 141 and 142; a shifter 143 for right shifting a subtraction result from subtracter 140 by a prescribed number of bits in accordance with the control signal; and an output processing portion 150 for obtaining an absolute value of an output from shifter 143 and outputting an absolute difference value between values of samples x and y. A bit width of data input to subtracter 140 is smaller than those of samples x and y.

The prescribed number of bits by which shifters 141, 142 and 143 shift data is the same as the number of bits where Cp=0. In other words, the prescribed number of bits is a bit width of a bit string where bit values of samples x and y match.

When a bit width of input data is larger than that of subtracter 140, a lower bit of the input data is rounded and applied to subtracter 140. This resulted in decrease in calculation accuracy. In difference computing element 23 according to the present embodiment, however, calculation is performed by subtracter 140 except for an upper bit which would not affect a calculation result of a difference value. Therefore, calculation accuracy would not always decrease. In addition, as the bit width of data input to subtracter 140 can be smaller than those of samples x and y, power consumption is reduced. Similarly, reduction in power consumption can be achieved also in a motion estimation apparatus employing a number of subtracters 140.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An adaptive difference computing element, comprising:
   first means receiving first and second data with the same bit lengths and each having bits at one and the other ends, determining if a prescribed relation is obtained between a first bit string of said first data and a second bit string of said second data for each bit of said first bit string and corresponding each bit of said second bit string, and replacing said each bit of said first bit string and said corresponding each bit of said second bit string with the same predetermined bit value if said prescribed relation is obtained, and otherwise directly outputting said first and second data; and
   a subtracter having inputs connected to receive said first and second data from said first means.

2. The adaptive difference computing element according to claim 1, wherein said first means further includes second means determining if said first bit string and said second bit string match for each bit of said first bit string and corresponding each bit of said second bit string, and replacing said each bit of said first bit string and said corresponding each bit of said second bit string with the same predetermined bit value if they match, and otherwise directly outputting said first and second data.

3. The adaptive difference computing element according to claim 2, wherein said predetermined bit value is 0 of a binary digit.

4. The adaptive difference computing element according to claim 2, wherein said second means includes:
   a plurality of matching circuits each provided corresponding to a pair of bits including each bit of said first bit string and said corresponding each bit of said second bit string for determining if said pair of bits are equal for every pair of bits and outputting a determination signal;
   a circuit for outputting said predetermined bit value in a fixed state; and
   a plurality of selector circuits corresponding to said plurality of matching circuits, each having an input receiving a bit of said first or second data and an input receiving a bit which has said predetermined bit value, and being controlled by a determination signal output from corresponding one of said plurality of matching circuit.

5. The adaptive difference computing element according to claim 4, wherein each of said plurality of matching circuits includes:
   exclusive OR circuits provided for every pair of bits each having two inputs for receiving each pair of bits; and
   an AND circuit having its input receiving an output value from said exclusive OR circuits and its output connected to said determination signal.

6. The adaptive difference computing element according to claim 5, wherein said AND circuit includes a Manchester type carry propagation circuit provided corresponding to said one or more exclusive OR circuits and having one or more inputs each receiving a negation value of an output from said corresponding one or more exclusive OR circuits, a carry-in input connected to a potential corresponding to said predetermined bit value and a carry-out output connected to said determination signal.

7. An adaptive difference computing element, comprising:
   first means receiving first and second binary data for determining if bit strings including target bits match for each of said first and second data;
   first and second shifters for shifting said first and second data toward a side of an upper bit by a number of bits which is determined depending on the values of said bit strings;
   a subtracter for calculating a difference between outputs of said first and second shifters; and
   a third shifter connected to said subtracter for shifting the output from said subtracter toward a side of a lower bit by said number of bits,
   bit width of data input to said subtracter being smaller than those of said first and second data.

* * * * *

UNITED STATES PATENT AND TRADEMARK OFFICE
CERTIFICATE OF CORRECTION

PATENT NO.    : 6,594,396 B1
DATED         : July 15, 2003
INVENTOR(S)   : Toyohiko Yoshida et al.

It is certified that error appears in the above-identified patent and that said Letters Patent is hereby corrected as shown below:

<u>Title page,</u>
Item [73], Assignees: after "Moshnyaga", change "Tokyo" to -- Fukuoka --

Signed and Sealed this

Twenty-fifth Day of November, 2003

JAMES E. ROGAN
*Director of the United States Patent and Trademark Office*